United States Patent
Fujinami (10) Patent No.: US 6,178,147 B1
(45) Date of Patent: Jan. 23, 2001

(54) RECORDING METHOD, RECORDING APPARATUS, REPRODUCING METHOD AND REPRODUCING APPARATUS

(75) Inventor: Yasushi Fujinami, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/137,395

(22) Filed: Aug. 20, 1998

(30) Foreign Application Priority Data

Aug. 22, 1997 (JP) .................................................. 9-226500

(51) Int. Cl.[7] ...................................................... G11B 7/00
(52) U.S. Cl. ................................ 369/48; 369/49; 369/59; 369/54
(58) Field of Search ..................... 369/54, 47, 48, 369/49, 50, 58, 59, 60.01; 360/48, 51, 53, 39

(56) References Cited

U.S. PATENT DOCUMENTS 5,519,681 * 5/1996 Maeda et al. ...................... 369/59 X
5,717,670 * 2/1998 Mitsuno ............................. 369/59 X

* cited by examiner

*Primary Examiner*—Muhammad Edun
(74) *Attorney, Agent, or Firm*—Frommer Lawrence & Haug, LLP; William S. Frommer (57) ABSTRACT

A recording method, a recording apparatus, a reproducing method and a reproducing apparatus for a recording medium such as an optical disk or the like are able to simultaneously record and simultaneously reproduce a plurality of independent information or to execute the recording and the reproduction thereof simultaneously with ease. The apparatus includes a plurality of buffer means (7a, 7b) for respectively, individually and temporarily memorizing a plurality of independent recording data or reproducing data and a pickup (2) for recording the recording data memorized in the respective buffer means (7a, 7b) on respective different recording areas in a time-division manner and reproducing data recorded on the respective different recording areas in a time-division manner.

18 Claims, 5 Drawing Sheets

RECORDING METHOD, RECORDING APPARATUS, REPRODUCING METHOD AND REPRODUCING APPARATUS

BACKGROUND OF THE INVENTION

The present invention relates to a recording method and a reproducing method for recording or reproducing data on or from a recording medium such as an optical disk, a magneto-optical disk, a magnetic disk (hard disk) or the like and a recording apparatus a reproducing apparatus to which the recording method and the reproducing method are applicable.

A variety of recording apparatus and reproducing apparatus using an optical disk have heretofore been commercially available. Such recording apparatus and reproducing apparatus are able to record binary data (digital data of 1 or 0) modulated in a predetermined format by forming pits on the surface of a disk, for example. Upon reproduction, the existence of pits is detected from a reflected-back light of laser light or beam irradiated on the disk surface and the binary data thus recorded is reproduced.

Also, there have hitherto been known a recording apparatus and a reproducing apparatus using a disk called a magneto-optical disk in which a magnetization film in which information is recorded in the magnetization direction is formed as a recording film, information is recorded on the recording film at the position irradiated with a laser beam under the condition that a modulated magnetic field is generated and upon reproduction, recorded information is reproduced by detecting a change corresponding to the magnetization direction of a reflectance of laser beam. In this specification, an optical disk refers to a disk that may be recorded or reproduced by laser beam and includes a magneto-optical disk and a phase-change disk.

When information is recorded on an optical disk or information recorded on the optical disk is reproduced, information is recorded on the track located at the scanned position by scanning tracks of spiral-shape formed on the disk or information is reproduced from the track located at the scanned position. Therefore, fundamentally, a set of information are recorded on the scanned track or a set of information are reproduced from the scanned track. For this reason, information of a plurality of systems cannot be recorded on a plurality of different tracks simultaneously or information that are recorded on a plurality of different tracks cannot be reproduced simultaneously.

Also, when information is recorded on the optical disk, it is frequently intended to confirm by reproduction whether or not such information is recorded reliably. In such case, after the recording of information was ended, the recorded portion should be reproduced. There is then the problem that a time the duration of which is the same as that required by the recording is required in order to reproduce the recorded portion for confirming whether or not information was recorded positively.

If there are provided a plurality of optical pickups and laser beams from the plurality of optical pickups are irradiated on respective separate tracks on the optical disk, then information can be recorded on or reproduced from a plurality of tracks simultaneously. Also, it becomes possible to reproduce information, which was just recorded by a laser beam from one optical pickup, by a laser beam from other optical pickup. However, if there are provided a plurality of optical pickups, then assemblies used as an optical disk apparatus increase unavoidably, and all laser beams that are irradiated on respective tracks from the plurality of optical pickups should be properly servo-controlled. As a consequence, an arrangement of such servo-control system becomes complicated considerably.

While the problem, which encountered with the prior art when the optical disk is recorded and reproduced, has been described so far, a similar problem will arise when information is recorded on and reproduced from a variety of recording media.

SUMMARY OF THE INVENTION

In view of the aforesaid aspect, it is an object of the present invention to provide a recording method, a recording apparatus, a reproducing method and a reproducing apparatus in which a plurality of independent informations may be simply recorded simultaneously and may be reproduced simultaneously or the recording and reproduction of information may be simply executed at the same time.

According to an aspect of the present invention, a plurality of independent recording data or reproducing data are respectively and temporarily memorized, respective memorized recording data are recorded on respective different recording areas in a time-division manner, and data that are recorded on the respective different recording areas are reproduced in a time-division manner.

Therefore, according to the above-mentioned processing, since one pickup is able to record or reproduce a plurality of recording areas in a time-division manner, one pickup becomes possible to simultaneously record or simultaneously reproduce a plurality of independent informations or to execute the recording and the reproducing simultaneously.

DESCRIPTION OF THE PREFERRED EMBODIMENTS

An embodiment of the present invention will hereinafter be described with reference to the accompanying drawings.

Figure 1:
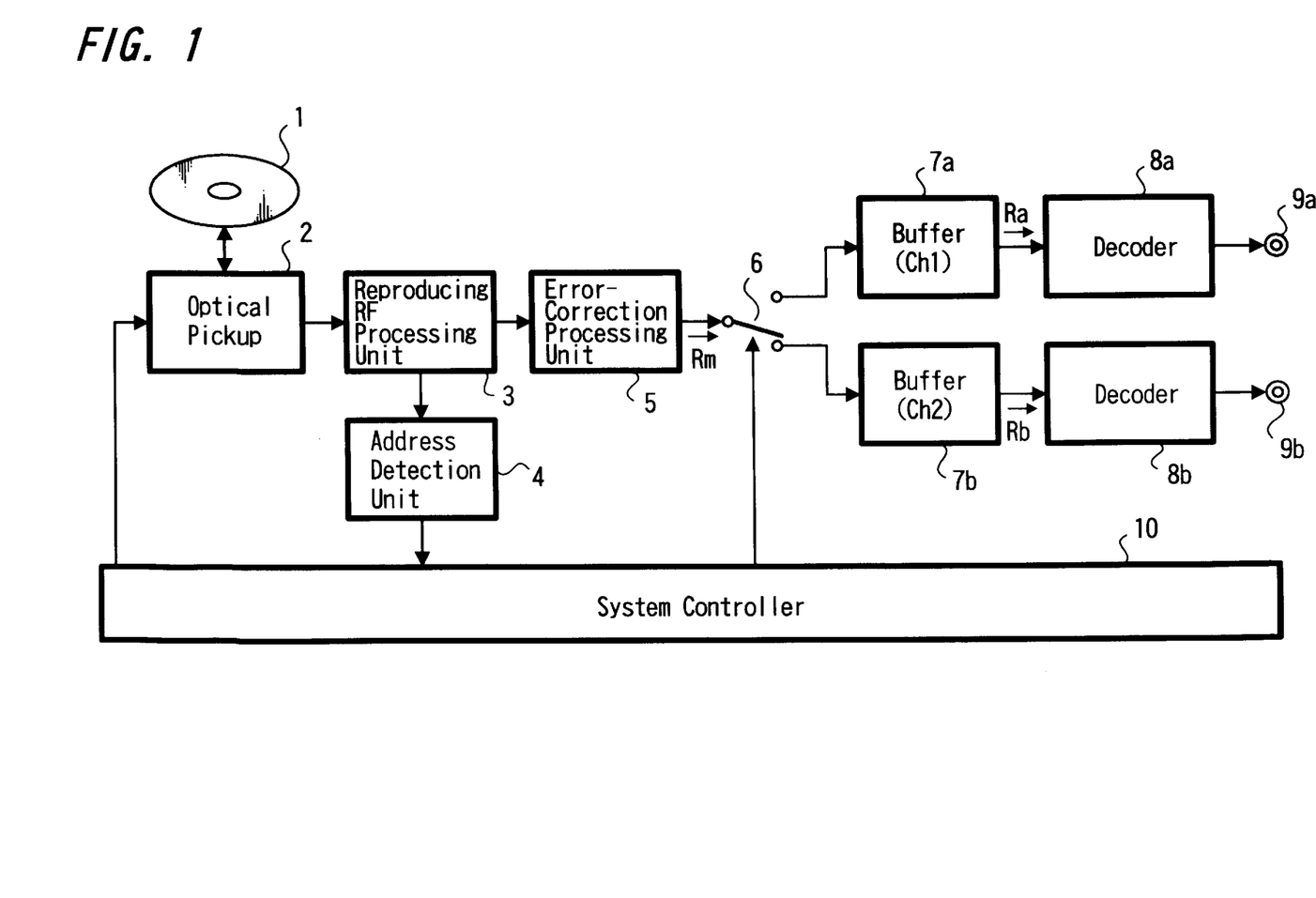
FIG. 1 is a block diagram showing an example of a reproducing system according to an embodiment of the present invention.

FIG. 1 of the accompanying drawings is a block diagram showing a reproducing system of an optical disk apparatus according to an embodiment of the present invention. As shown in FIG. 1, an optical disk 1 loaded onto the optical disk apparatus according to this embodiment is rotated by a spindle motor (not shown). Under this rotating condition, a laser beam from an optical pickup 2 is irradiated on the signal recording surface of the optical disk 1, and a reproduced signal is obtained by detecting a reflected-back laser beam from the signal recording surface by the optical pickup 2.

The reproduced signal detected by the optical pickup 2 is supplied to a reproducing RF processing unit 3, in which reproduced data (digital data) is detected from a high-frequency signal which is as a reproduced signal. The detected reproduced data is supplied to an error-correction processing unit 5 and address data contained in the reproduced data is supplied to an address detection unit 4. The error-correction processing unit 5 error-corrects the reproduced data by using an error-correction code contained in the reproduced data or the like. The reproduced data thus error-corrected is supplied through a change-over switch 6 to a buffer 7a of channel 1 (hereinafter referred to as Ch1) and a buffer 7b of channel 2 (hereinafter referred to as Ch2).

The address detection unit 4 detects a reproducing address from the supplied address data and the supplies detected data to a system controller 10. Reproducing address data is supplied to the system controller 10, whereby a so-called seek control process is effected such that a track position of laser beam irradiated on the optical disk 1 from the optical pickup 2 may agree with a desired track position. Also, on the basis of the reproducing address detected at the address detection unit 4, the system controller 10 controls the switching of the change-over switch 6 in such a manner as to distribute the reproduced data to the 2-channel buffer 7a or 7b.

The reproduced data supplied to the buffer 7a of Ch1 is supplied to a decoder 8a of Ch1 and thereby decoded. The decoded reproduced data from the decoder 8a is developed at an output terminal 9a of Ch1. Also, the reproduced data supplied to the buffer 7b of Ch2 is supplied to a decoder 8b of Ch2 and thereby decoded. The decoded reproduced data from the decoder 8b is developed at an output terminal 9b of Ch2.

As the optical disk 1 that is reproduced by the optical disk apparatus according to this embodiment, there may be used such an optical disk on which data recording tracks of spiral or concentric shape are formed and Ch1 data and Ch2 data are separately recorded at two discrete positions of the recording track. Ch1 data and Ch2 data may be those which are either relating to each other or not relating to each other at all.

Figure 2A:
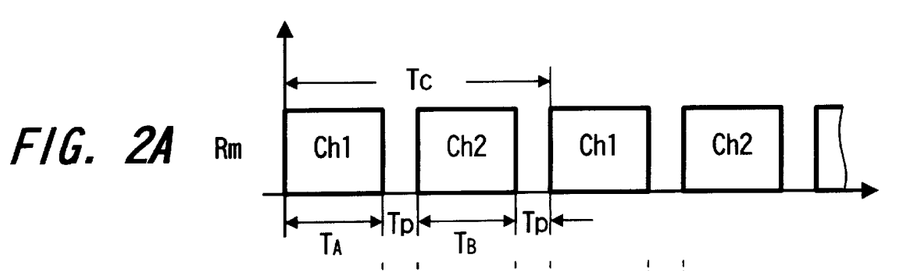
FIGS. 2A, 2B, 2C are characteristic diagrams showing an example of a reproducing state according to the embodiment of the present invention.
Figures 2B, 2C:
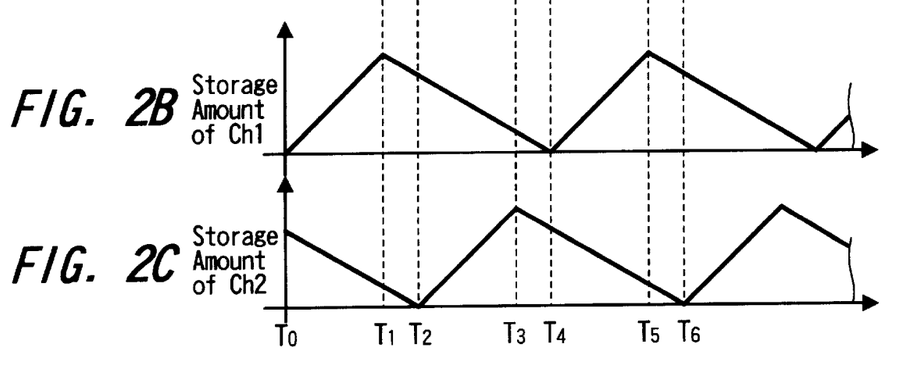

In this embodiment, two-channel data may be reproduced simultaneously. The manner in which two-channel data are reproduced simultaneously will be described below with reference to FIG. 2. FIGS. 2A to 2C are characteristic diagrams showing the manner in which data of Ch1 and data of Ch2 are reproduced simultaneously. In FIGS. 2A through 2C, a vertical axis represents a data amount, and a horizontal axis represents an elapse of time. FIG. 2A shows the reproducing state of the optical pickup 2, in which the track in which data of Ch1 is recorded is reproduced in the range shown as Ch1 and the track in which data of Ch2 is recorded is reproduced in the range shown as Ch2. In the range shown as Tp, there is executed a seek control processing for changing the position of the track that is reproduced by the optical pickup 2. FIG. 2B shows a data storage amount of the buffer 7a which temporarily memorizes reproduced data of Ch1, while FIG. 2C shows a data storage amount of the buffer 7b which temporarily memorizes reproduced data of Ch2.

As shown in FIGS. 2A to 2C, in the case of this embodiment, two-channel data of Ch1 and Ch2 are alternately reproduced from the optical disk 1 and memorized in the buffer 7a or 7b of each channel. Reproduced data of respective channels Ch1, Ch2 are successively reproduced from the buffers 7a and 7b of Ch1 and Ch2 and reproduced data of the respective channels Ch1 and Ch2 are successively outputted from the output terminal 9a of Ch1 and the output terminal 9b of Ch2, respectively.

To be more concrete, at a timing T0 (or a timing at which a first reproduction instruction is issued) at which data of a minimum amount obtained immediately before the reproduced data of Ch1 stored in the buffer 7a is lost is stored, the optical pickup 2 is placed at the position of the track at which data of Ch1 is recorded under seek control. Also, the change-over switch 6 is connected to the buffer 7a side to start the reading of the data of Ch1. At a timing T1 at which an amount of stored data reaches a constant storage amount, the reading of this data is stopped, and the optical pickup 2 is moved to the position of the track in which data of Ch2 is recorded under seek control during a time period of Tp (second). Also, the change-over switch 6 is connected to the buffer 7b side. The timing T2 of this track position is set to such one obtained immediately before the reproduced data of Ch2 stored in the buffer 7b is lost.

The reading of the data of Ch2 is started at the timing T2, and the reading of this data is stopped at a timing T3 at which an amount of stored reproduced data reaches a constant storage amount. At the next timing T4, the optical pickup 2 is moved to the position of the track in which data of Ch1 is recorded under seek control during a time period of Tp (second), and the change-over switch 6 is connected to the buffer 7a side. Then, the reproducing processing is repeatedly executed in such a manner that data stored in each of the buffers 7a, 7b will not be lost. Thus, two-channel data are reproduced simultaneously. As shown in FIG. 2A, reference letter TA depicts a period during which data of Ch1 is read out, and reference letter TB depicts a period during which data of Ch2 is read out.

When the track address is controlled by the system controller 10, the track address obtained when the reading of data of each channel from the optical disk 1 is paused is memorized in the system controller 10. Then, when the reading of data of that channel is resumed, the seek control is executed in such a manner that the reproduction of such track address is resumed. The time Tp (second) required by one seek processing is set to a time corresponding to a time period required when the optical pickup 2 is moved from the innermost periphery to the outermost periphery of the optical disk 1. Also, when the optical disk 1 is reproduced initially, data of Ch1 is read out and a certain amount of data of Ch1 is stored in the buffer 7a and also data of Ch2 is read out and a certain amount of data of Ch2 is stored in the buffer 7b. Thereafter, data are started to be simultaneously outputted from the two buffers 7a, 7b, and data of two channels are started to be simultaneously outputted from the output terminals 9a, 9b.

Further, the maximum storage capacities and the minimum storage capacities of the buffers 7a, 7b are determined based on a transfer rate at which data is read out from the disk, a transfer rate of data of each channel a time, and so on. In this case, the maximum data storage amounts of the two buffers 7a, 7b and the minimum data storage amounts of the two buffers 7a, 7b are not always the same.

Figures 3A, 3B:
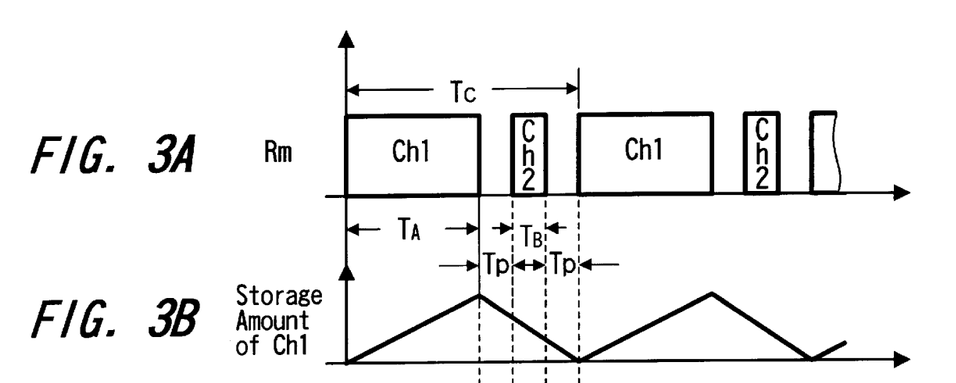
FIGS. 3A, 3B, 3C are characteristic diagram showing another example of a reproducing state according to the embodiment of the present invention.
Figure 3C:
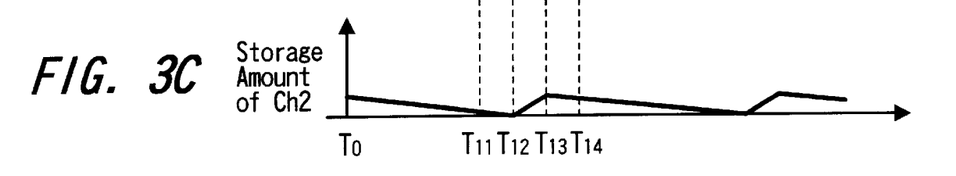

FIGS. 3A to 3C are characteristic diagrams showing another example in which data of two channels are reproduced simultaneously when a transfer rate of data of Ch1 and a transfer rate of data of Ch2 are different from each other. In this example, with respect to the transfer rate at which the optical pickup 2 reproduces data from the optical disk 1, the data of Ch1 and the data of Ch2 are reproduced at the same transfer rate. With respect to transfer rates at which data stored in the buffers 7a, 7b are outputted, the data of Ch1 is outputted at a relatively large transfer rate and the data of Ch2 is outputted at a relatively small transfer rate.

The processing shown in FIGS. 3A to 3C will be described below. At a timing T0 (or at a timing at which a first reproduction instruction is issued) in which data of a minimum amount obtained immediately before the reproduced data of Ch1 stored in the buffer 7a is lost is stored, the optical pickup 2 is placed at the position of the track at which data of Ch1 is recorded under seek control. Also, the change-over switch 6 is connected to the buffer 7a side to start the reading of the data of Ch1. At a timing T11 at which an amount of stored data reaches a constant storage amount, the reading of this data is stopped, and the optical pickup 2 is moved to the position of the track in which data of Ch2 is recorded under seek control during a time period of Tp (second). Also, the change-over switch 6 is connected to the buffer 7b side. The timing T12 of this track position is set to such one obtained immediately before the reproduced data of Ch2 stored in the buffer 7b is lost.

The reading of the data of Ch2 is started at the timing T12, and the reading of this data is stopped at a timing T13 at which an amount of stored reproduced data reaches a constant storage amount. Here, the timing T12 is moved to the timing T13 during a relatively short period of time. When this timing T13 is reached, the optical pickup 2 is moved to the position of the track in which data of Ch1 is recorded under seek control during a time period of Tp(second) at a timing T14, and the change-over switch 6 is connected to the buffer 7a side. Then, the reproducing processing is repeatedly executed in such a manner that data stored in each of the buffers 7a, 7b will not be lost. Thus, two-channel data with different data transfer rates are reproduced simultaneously.

A relationship between the transfer rate of data and storage capacity of buffer will be described below. In FIG.2, reference letter Rm assumes a transfer rate of reproduced data supplied from the error-correction processing unit 5 to the change-over switch 6, Ra and Rb assumes transfer rates of data of respective channels outputted from the two-channel buffers 7a, 7b, as shown in FIGS. 2A to 2C and FIGS. 3A to 3C, Tc assumes a period of one cycle in which the reproduction of data of Ch1 and the reproduction of data of Ch2 are repeated, TA assumes one data reproduction period of data of Ch1, TB assumes one data reproduction period of data of Ch2 and Tp (second) assumes a time period required by one seek processing. Then, the period Tc of one cycle is expressed by the following equation (1):

$$Tc = T_A + T_B + 2Tp \quad (1)$$

In order to protect the buffers 7a, 7b from the overflow and the underflow, a relationship expressed by the following equation (2) is established:

$$T_A \cdot Rm = Tc \cdot R_A$$
$$T_B \cdot Rm = Tc \cdot R_B \quad (2)$$

Then, when necessary buffer capacities are calculated, the output rates Ra, Rb should be kept constant during a period in which data is not supplied. Therefore, a storage capacity Ba of the buffer 7a is expressed by the following equation (3), and a storage capacity Bb of the buffer 7b is expressed by the following equation (4):

$$Ba = \frac{R_A \cdot 2T_P(R_m - R_A)}{R_m - R_A - R_B} \quad (3)$$

$$Bb = \frac{R_B \cdot 2T_P(R_m - R_B)}{R_m - R_A - R_B} \quad (4)$$

Incidentally, when the output rates of the data Ch1, Ch2 are the same value Rs, a ratio between the transfer rate Rm of the buffer input side and the transfer rate Rs of the buffer output side is given as shown by the following equation (5):

$$\frac{R_S}{R_m} = \frac{Tc - 2 \times Tp}{2 \times Tc} \quad (5)$$

The buffer storage capacity required in that case is expressed by the following equation (6):

$$\text{buffer storage capacity} = R_S \times \left(Tc - \frac{Tc - 2 \times Tp}{2}\right) \quad (6)$$

If the buffer storage capacities are set as described above and the reproduction processing is executed as described above, then the different data of two channels (2 series) reproduced from the optical disk 1 may be outputted from the output terminals 9a, 9b simultaneously. In this case, since one optical pickup 2 is used in a time-division manner, the arrangement of the optical disk apparatus may be simplified considerably as compared with the case in which there are provided optical pickups of the same number as that of the channels. A variety of servo-controls for the optical pickup may be executed in the same manner as that executed when data of one channel is generally reproduced. Thus, a variety of servo-operations may be realized under simple control.

The following tables 1 to 3 show minimum buffer storage capacities that are calculated from the relationships of the transfer rate Rm required when data is reproduced from the optical disk 1 by the optical pickup 2, the output rates Ra, Rb of the two channels Ch1, Ch2 and the seek time Tp. The table 1 shows the minimum buffer storage capacity of the channel Ch1; the table 2 shows the minimum buffer storage capacity of the channel Ch2; and the table 3 shows the total storage capacity of the storage capacities of the buffers 7a, 7b of the two channels Ch1, Ch2. The tables 1 to 3 show three kinds of 0.5 second, 0.3 second, 0.085 second as the seek time Tp. A disk drive apparatus in which the seek time Tp is 0.085 second has the highest seek speed in the disk drive apparatus which are now commercially available on the market.

TABLE 1

| TRANSFER RATE FROM DISK RM = 35.000 [Mbps] | | BUFFER CAPACITY | BUFFER CAPACITY | BUFFER CAPACITY |
|---|---|---|---|---|
| OUTPUT RATE Ra [Mbps] of Ch1 | OUTPUT RATE Rb [Mbps] of Ch2 | [bit] OF SEEK TIME Tp 0.500 (sec.) | [bit] OF SEEK TIME Tp 0.300 (sec.) | [bit] OF SEEK TIME Tp 0.085 (sec.) |
| 5.000 | 5.000 | 6.000 | 3.600 | 1.020 |
| 10.000 | 10.000 | 16.667 | 10.000 | 2.833 |

TABLE 1-continued

| TRANSFER RATE FROM DISK RM = 35.000 [Mbps] | | BUFFER CAPACITY | BUFFER CAPACITY | BUFFER CAPACITY |
|---|---|---|---|---|
| OUTPUT RATE Ra [Mbps] of Ch1 | OUTPUT RATE Rb [Mbps] of Ch2 | [bit] OF SEEK TIME Tp 0.500 (sec.) | [bit] OF SEEK TIME Tp 0.300 (sec.) | [bit] OF SEEK TIME Tp 0.085 (sec.) |
| 15.000 | 15.000 | 60.000 | 36.000 | 10.200 |
| 5.000 | 1.536 | 5.270 | 3.162 | 0.896 |
| 5.000 | 0.768 | 5.131 | 3.079 | 0.872 |
| 10.000 | 1.536 | 10.655 | 6.393 | 1.811 |
| 10.000 | 0.768 | 10.317 | 6.190 | 1.754 |
| 15.000 | 1.535 | 16.247 | 9.748 | 2.762 |
| 15.000 | 0.768 | 15.599 | 9.359 | 2.652 |
| 5.000 | 0.384 | 5.065 | 3.039 | 0.861 |
| 5.000 | 0.448 | 5.076 | 3.045 | 0.863 |
| 10.000 | 0.384 | 10.156 | 6.094 | 1.727 |
| 10.000 | 0.448 | 10.182 | 6.109 | 1.731 |
| 15.000 | 0.384 | 15.294 | 9.176 | 2.600 |
| 15.000 | 0.448 | 15.344 | 9.206 | 2.608 |

TABLE 2

| TRANSFER RATE FROM THE DISK Rm = 35.000 [Mbps] | | BUFFER CAPACITY | BUFFER CAPACITY | BUFFER CAPACITY |
|---|---|---|---|---|
| OUTPUT RATE Ra [Mbps] OF Ch1 | OUTPUT RATE Rb [Mbps] OF Ch2 | [bit] OF SEEK TIME Tp 0.500 (sec.) | [bit] OF SEEK TIME Tp 0.300 (sec.) | [bit] OF SEEK TIME Tp 0.085 (sec.) |
| 5.000 | 5.000 | 6.000 | 3.600 | 1.020 |
| 10.000 | 10.000 | 16.667 | 10.000 | 2.833 |
| 15.000 | 15.000 | 60.000 | 36.000 | 10.200 |
| 5.000 | 1.536 | 1.806 | 1.083 | 0.307 |
| 5.000 | 0.768 | 0.899 | 0.540 | 0.153 |
| 10.000 | 1.536 | 2.191 | 1.314 | 0.372 |
| 10.000 | 0.768 | 1.085 | 0.651 | 0.184 |
| 15.000 | 1.535 | 2.782 | 1.669 | 0.473 |
| 15.000 | 0.768 | 1.367 | 0.820 | 0.232 |
| 5.000 | 0.384 | 0.449 | 0.269 | 0.076 |
| 5.000 | 0.448 | 0.524 | 0.314 | 0.089 |
| 10.000 | 0.384 | 0.540 | 0.324 | 0.092 |
| 10.000 | 0.448 | 0.630 | 0.378 | 0.107 |
| 15.000 | 0.384 | 0.678 | 0.407 | 0.115 |
| 15.000 | 0.448 | 0.792 | 0.475 | 0.135 |

TABLE 3

| TRANSFER RATE FROM THE DISK Rm = 35.000 [Mbps] | | BUFFER CAPACITY | BUFFER CAPACITY | BUFFER CAPACITY |
|---|---|---|---|---|
| OUTPUT RATE Ra [Mbps] OF Ch1 | OUTPUT RATE Rb [Mbps] OF Ch2 | [bit] OF SEEK TIME Tp 0.500 (sec.) | [bit] OF SEEK TIME Tp 0.300 (sec.) | [bit] OF SEEK TIME Tp 0.085 (sec.) |
| 5.000 | 5.000 | 12.000 | 7.200 | 2.040 |
| 10.000 | 10.000 | 33.333 | 20.000 | 5.667 |
| 15.000 | 15.000 | 120.000 | 72.000 | 20.400 |
| 5.000 | 1.536 | 7.076 | 4.245 | 1.203 |
| 5.000 | 0.768 | 6.031 | 3.618 | 1.025 |
| 10.000 | 1.536 | 12.845 | 7.707 | 2.184 |
| 10.000 | 0.768 | 11.402 | 6.841 | 1.938 |
| 15.000 | 1.535 | 19.029 | 11.417 | 3.235 |
| 15.000 | 0.768 | 16.966 | 10.180 | 2.884 |
| 5.000 | 0.384 | 5.514 | 3.308 | 0.937 |
| 5.000 | 0.448 | 5.600 | 3.360 | 0.952 |
| 10.000 | 0.384 | 10.696 | 6.418 | 1.818 |
| 10.000 | 0.448 | 10.813 | 6.488 | 1.838 |
| 15.000 | 0.384 | 15.971 | 9.583 | 2.715 |
| 15.000 | 0.448 | 16.135 | 9.681 | 2.743 |

Of the buffer storage capacities described on the above-mentioned table 3, let us show the following preferred inventive examples.

INVENTIVE EXAMPLE 1

When (transfer rate Rm)≦35[Mbps], (seek time Tp)= 0.085 [second], (output rate Ra of channel Ch1)≧10[Mbps] and (output rate Rb of channel Ch2)≧10[Mbps], a minimum buffer storage capacity of about 5.7[Mbit] is required. This inventive example 1 may be applied to the case in which a video signal and an audio signal of the same capacity are reproduced in the two channels of Ch1, Ch2, for example.

INVENTIVE EXAMPLE 2

When (transfer rate Rm)≦35[Mbps], (seek time Tp)= 0.085[second], (output rate Ra of channel Ch1) "10[Mbps] and (output rate Rb of channel Ch2)≧0.768[Mbps], a minimum buffer storage capacity of about 1.9[Mbit] is required. This inventive example 2 may be applied to the case in which, for example, a video signal and an audio signal of a rate of 10[Mbps] are reproduced in the channel Ch1 and an audio signal of a rate of 0.768[Mbps] is reproduced in the channel Ch2.

INVENTIVE EXAMPLE 3

When (transfer rate Rm)≦35[Mbps], (seek time Tp)= 0.085[second], (output rate Ra of channel Ch1)≧10[Mbps] and (output rate Rb of channel Ch2)≧0.384[Mbps], a minimum buffer storage capacity of about 1.8[Mbit] is required. This inventive example 3 may be applied to the case in which, for example, a video signal and an audio signal of a rate of 10[Mbps] are reproduced in the channel Ch1 and an audio signal, which was compressed to a rate of 0.384 [Mbps] is reproduced in the channel Ch2.

INVENTIVE EXAMPLE 4

When (transfer rate Rm)≦35[Mbps], (seek time Tp)= 0.085[second], (output rate Ra of channel Ch1)≧10[Mbps] and (output rate Rb of channel Ch2)≧0.448[Mbps], a minimum buffer storage capacity of about 1.8[Mbit] is required. This inventive example 4 may be applied to the case in which, for example, a video signal and an audio signal of a rate of 10[Mbps] are reproduced in the channel Ch1 and an audio signal, which was compressed to a rate of 0.448 [Mbps] is reproduced in the channel Ch2.

In the respective inventive examples, when the seek time Tp is changed, the storage capacities required as the buffers also change in correspondence therewith.

While the two-channel simultaneous processing is applied to the reproducing processing as described above, the present invention is not limited thereto, and the two-channel simultaneous processing may be applied to a recording processing.

Figure 4:
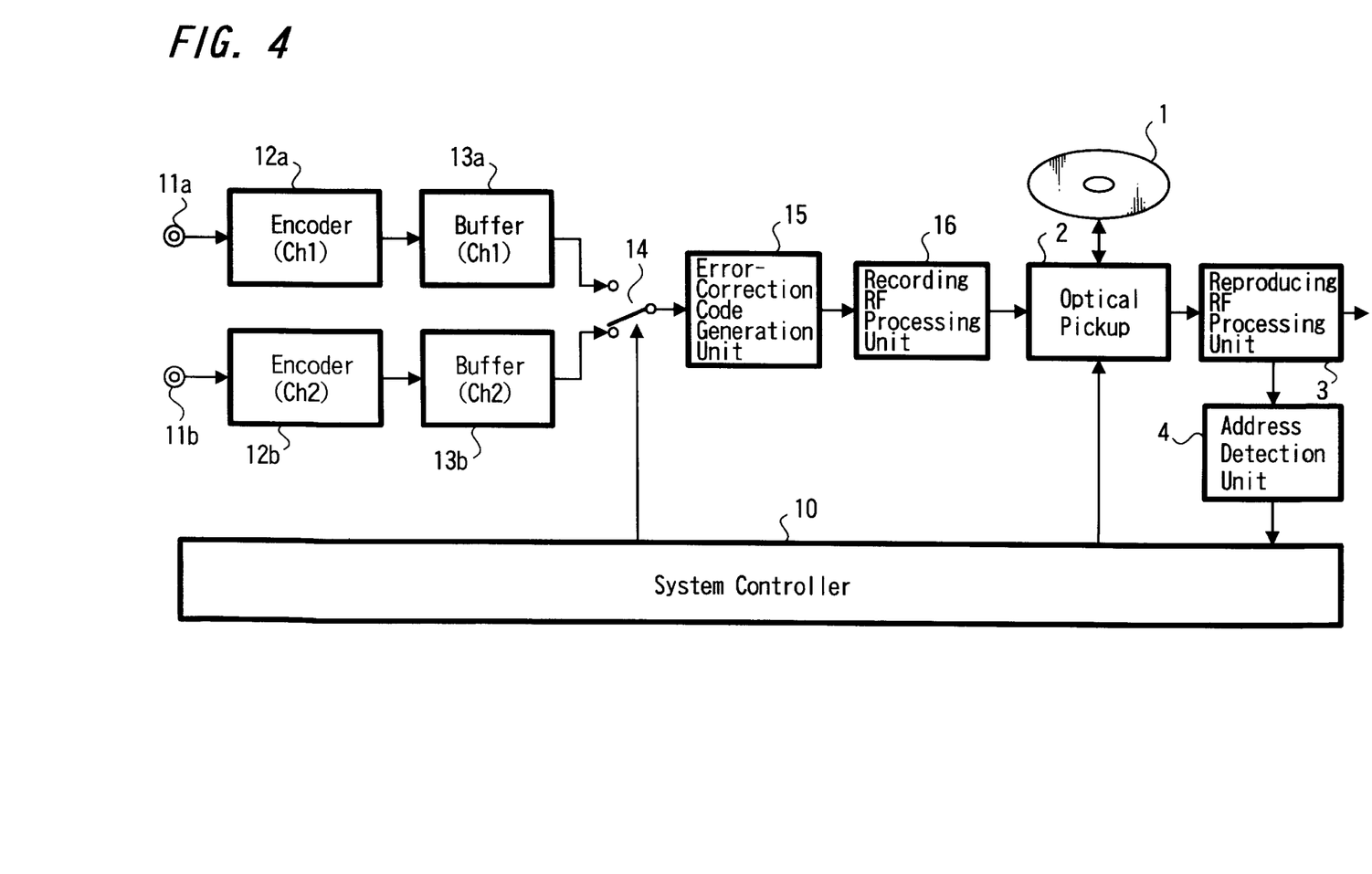
FIG. 4 is a block diagram showing an arrangement of a recording system according to the embodiment of the present invention.

FIG. 4 is a block diagram showing a recording system. As shown in FIG. 4, recording data obtained at a Ch1 recording data input terminal 11a and recording data obtained at a Ch2 recording data input terminal 11b are respectively supplied to separate encoders 12a (Ch1), 12b(Ch2) and thereby encoded for recording. Encoded data of channels Ch1, Ch2 from the encoders 12a, 12b are respectively supplied to separate buffers 13a (Ch1), 13b (Ch2) and thereby stored temporarily.

The recording data of the respective channels Ch1, Ch2 stored in the two buffers 13a, 13b are alternately outputted through the switching of a change-over switch 14 and supplied to an error-correction code generation unit 15, thereby added with an error-correction code generated. At that time, the change-over switch 14 is switched under control of the system controller 10. Then, the recording data, which was added with the error-correction code by the error-correction code generation unit 15, is supplied to a recording RF processing unit 16, whereby it is processed by a recording RF processing. The recording data thus processed is supplied to the optical pickup 2 and a light-emission state of laser beam is controlled or the like, whereby data is recorded on a predetermined track of the optical disk 1. Alternatively, in the case of an optical disk (magneto-optical disk) which requires a magnetic field modulation upon recording, the recording data is supplied to a magnetic field modulation coil or the like.

The address detection unit 4 connected to the reproducing RF processing unit 3 detects an address of a track on which data is recorded, and supplies detected data to the system controller 10. Under control of the system controller 10, data of two channels supplied from the two buffers 13a, 13b are recorded on separate tracks, respectively.

The data storage states of the two buffers 13a, 13b and the address control state of the track recorded by the optical pickup 2 are just opposite to the states in the reproducing mode that has been described so far with reference to FIG. 2 or 3. In this case, the recording of two-channel data is switched in such a manner that the recording data storage amounts of the respective buffers 13a, 13b may not exceed the maximum storage capacity. With respect to a relationship between an input rate and an output rate of the two buffers 13a, 13b, the input rate and the output rate of the reproducing mode shown on the above-mentioned equations fall within an opposite relationship.

If the input rate, the output rate and so on are set and data are recorded as described above, then different inputted data of two channels (two series) simultaneously obtained at the input terminals 11a, 11b may be recorded on the optical disk 1. In this case, similarly to the case of the reproducing processing, since one optical pickup 2 is used in a time-division manner, the arrangement of the optical disk apparatus may be simplified considerably as compared with the case in which there are provided optical pickups whose number is corresponding to the number of the channels. A variety of servo-controls for controlling the optical pickup may be executed similarly to the ordinary case in which data of one channel is recorded, and hence may be realized by a simple control.

While the case in which the data of two channels are simultaneously reproduced or recorded has been described so far, the present invention is not limited thereto, and may be applied to a case in which data of more than three channels are simultaneously reproduced or recorded. Specifically, if the reproducing system includes buffers of more than three channels and the succeeding-stage circuits of more than three channels and the transfer rates, which were described with reference to the above-mentioned equations, are set in a relationship corresponding to the number of the channels, then the present invention may be similarly applied to the case in which data of more than three channels are simultaneously reproduced or recorded.

While the buffer memories of the reproducing-system circuit and the recording-system circuit are individually provided for every channel as described above, the present invention is not limited thereto, and the storage area of one memory may be divided into storage areas of the number corresponding to the number of channels, thereby being used as buffer memories of respective channels.

Further, while data of a plurality of channels are simultaneously reproduced or data of a plurality of channels are simultaneously recorded as described above, the present invention is not limited thereto, and data of a plurality of channels may be recorded and reproduced simultaneously in a time-division manner. Specifically, if both of the recording-system circuit and the reproducing-system circuit include buffers and the processing in which data stored in the buffer of the recording system is recorded on the optical disk and the processing in which data reproduced from the optical disk is stored in the buffer of the reproducing system are alternately executed in a time-division manner, then the recording of successively-inputted data on the optical disk and the successive output of data reproduced from the optical disk may be executed simultaneously. In this case, although recording data and reproducing data may not be related with each other, it is possible to confirm by reproducing date recorded immediately before on the optical disk whether or not data is correctly recorded on the optical disk.

Further, when data of a plurality of channels are reproduced simultaneously, the error-correction processing unit may require the error-correction processing memories of the number corresponding to the number of reproduced channels, and the present invention may cope with a case in which a reproducing channel is switched at a length less than one error-correction unit. Specifically, the error-correction processing unit generally stores data of several kilobytes to several tens of kilobytes in its internal memory to effect the error-correction processing. Thus, when a channel from which data is reproduced is switched, if no countermeasure is taken, then reproduced data of less than one constraint length to be error-corrected should be reproduced in the switching of the reproduction of that channel one more time.

Figure 5:
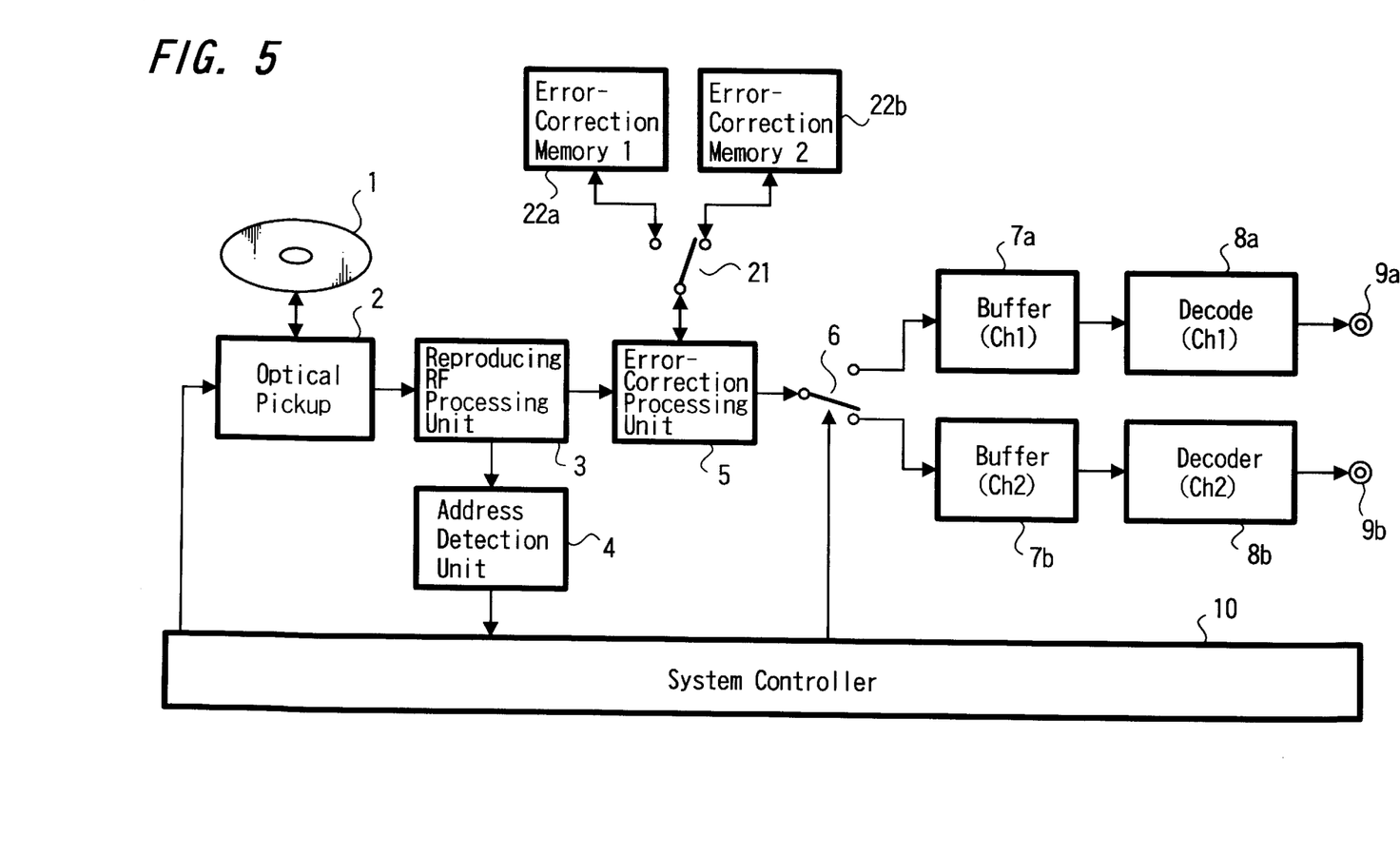
FIG. 5 is a block diagram showing another example of a reproducing system according to the embodiment of the present invention.

As shown in FIG. 5, there are prepared two memories 22a, 22b as error-correction memories required by the error-correction processing unit 5 and the memories 22a, 22b to be used are switched by a change-over switch 21 in unison with the switching of the reproducing channel. Therefore, if reproducing data of less than one constraint length is reproduced from the following portion of the same channel and inputted to the memory 22a or 22b when the same channel is reproduced next, then such reproducing data may be error-corrected correctly. Thus, when the reproducing channel is switched, the constraint length of error-corrected data need not be considered. A rest of the reproducing-system circuit shown in FIG. 5 is similar to that of the reproducing-system circuit shown in FIG. 1.

While the error-correction processing unit of the reproducing system requires the memories of a plurality of systems to effect the error-correction processing in FIG. 5, the present invention is not limited thereto, and the error-correction code generation unit of the recording system may require memories of a plurality of systems to effect the error-correction code generation processing. Furthermore, when data are recorded and reproduced in a time-division manner, the error-correction code generation memory and the error-correction processing memory may be formed of different memories, respectively.

While the present invention is applied to the optical disk recording apparatus or the optical disk reproducing apparatus as described above, it is needless to say that the present invention may be applied to methods and apparatus for recording or reproducing other recording media. Specifically, if there are provided a plurality of buffer means for temporarily and respectively storing a plurality of independent recording data or reproducing data, recording data memorized in the respective buffer means are respectively recorded on different recording areas in a time-division manner, there is provided a pickup (optical pickup, magnetic head, etc.) for reproducing data recorded on the respective different recording areas in a time-division manner and a recording medium may be recorded or reproduced by that pickup, then it is possible to use a variety of recording media. For example, the present invention may also be applied to a hard disk in which data is recorded on a magnetic disk by using a magnetic head and recorded data is reproduced from the magnetic disk by using such magnetic head.

According to a recording method as claimed in claim 1, since information are recorded on a plurality of recording areas in a time-division manner, a plurality of independent information may be simultaneously recorded on the recording medium with ease by a simple processing.

According to a recording method as claimed in claim 2, in the recording method as claimed in claim 1, a transfer rate at which the temporarily-memorized recording data are recorded on the recording medium is set to be a rate higher than a transfer rate of the plurality of recording data, and a storage capacity for temporarily memorizing the plurality of independent recording data is set on the basis of a data amount calculated from each transfer rate and a maximum seek time of means for recording the recording data on the recording medium. It is possible to satisfactorily control the processing in which a plurality of independent information are recorded in a time-division manner.

According to a recording method as claimed in claim 3, in the recording method as claimed in claim 1, since a timing at which the recording data are recorded on the recording medium in a time-division manner is controlled based on a memory remaining amount of the temporarily-memorized recording data, it is possible to control the time-division recording at a satisfactory timing.

According to a recording method as claimed in claim 4, in the recording method as claimed in claim 1, since the respective temporarily-memorized data are individually processed by an error-correction code generation processing, the minimum time-division recording unit may be selected to be less than a unit in which the error-correction code is added. Thus, each information may be recorded at an arbitrary timing in a time-division manner.

According to a recording method as claimed in claim 5, since a recording processing in which data of at least one series is temporarily memorized and the temporarily-memorized data is recorded on a recording medium and a processing in which the data recorded by the recording processing is reproduced from the recording medium and memorized temporarily are executed in a time-division manner instead of a processing in which a plurality of data are recorded in a time-division manner described in claim 1, recorded data, which was obtained immediately after the recording, may be reproduced by a simple control.

According to a recording apparatus as claimed in claim 6, since one pickup records data on a plurality of recording areas in a time-division manner, one pickup of simple arrangement becomes able to simultaneously record a plurality of independent information on the recording medium.

According to a recording apparatus as claimed in claim 7, in the recording apparatus as claimed in claim 6, since the recording medium is an optical disk and information is recorded on the recording medium by an optical pickup, the optical disk recording apparatus becomes able to simultaneously record a plurality of independent information on the recording medium by the simple arrangement of one optical pickup.

According to a recording apparatus as claimed in claim 8, in the recording apparatus as claimed in claim 7, since the optical pickup records data in a time-division manner based on a memory remaining amount of a buffer means, as a time-division recording of a plurality of independent information, it is possible to satisfactorily record respective different information that are inputted successively.

According to a recording apparatus according to claim 7, since the recording apparatus as claimed in claim 7 further comprises a plurality of error-correction code generating means for generating an error-correction code for date to be recorded and wherein the respective separate error-correction code generating means add the error-correction codes to recorded data temporarily-memorized in the respective separate buffer means, the minimum unit for recording information in a time-division manner may be set to be less than a unit in which an error-correction code is added. Thus, it becomes possible to record each information at an arbitrary timing in a time-division manner.

According to a recording apparatus as claimed in claim 10, since a processing in which data of at least one series is temporarily stored in a first buffer means and memorized data is recorded on a recording medium and a processing in which the data recorded by this processing is reproduced from the recording medium and temporarily memorized in a second buffer means are executed in a time-division manner instead of a processing in which a plurality of data are recorded in a time-division manner described in claim 6, it becomes possible for the simple arrangement using one pickup to reproduce recorded data obtained immediately-after the recording.

According to a reproducing method as claimed in claim 11, since information are reproduced from a plurality of recording areas in a time-division manner, the processing in which a plurality of independent information are simultaneously reproduced from the recording medium may be executed by a simple processing.

According to a reproducing method as claimed in claim 12, in the reproducing method as claimed in claim 11, since a transfer rate used when data is reproduced from the recording medium and temporarily memorized is set to be a rate higher than a transfer rate of the plurality of reproduced data, and a storage capacity for temporarily memorizing data is set by a data amount calculated from each transfer rate and a maximum seek time of a means for reproducing data from the recording medium, the processing in which a plurality of independent information are reproduced in a time-division manner may be controlled satisfactorily.

According to a reproducing method as claimed in claim 13, in the reproducing method as claimed in claim 11, since data are reproduced in a time-division manner based on a storage remaining capacity for temporarily memorizing data, the time-division reproduction may be controlled at a satisfactory timing.

According to a reproducing method as claimed in claim 14, in the reproducing method as claimed in claim 11, since respective data reproduced from the recording medium are individually error-corrected and the individually-error-corrected reproduced data are separately memorized temporarily, the minimum unit at which data are reproduced in a time-division manner may be set to be less than a unit in which the error-correction code is added to data. Thus, each information may be reproduced at an arbitrary timing in a time-division manner.

According to a reproducing apparatus as claimed in claim 15, since one pickup reproduces data from a plurality of recording areas in a time-division manner, one pickup becomes able to simultaneously reproduce a plurality of independent information from the recording medium by a simple arrangement.

According to a reproducing apparatus as claimed in claim 16, in the reproducing apparatus as claimed in claim 15, since the recording medium is an optical disk and an optical pickup reproduces data from the optical disk, the optical disk reproducing apparatus becomes able to simultaneously a plurality of reproduce independent information by a simple arrangement using one optical pickup.

Further, according to a reproducing apparatus as claimed in claim 17, in the reproducing apparatus as claimed in claim 16, since the optical pickup reproduces data in a time-division manner based on a memory remaining amount of the buffer means, when a plurality of independent information are reproduced in a time-division manner, respective information that are successively inputted may be recorded, and respective information may be reproduced and outputted successively.

Furthermore, according to a reproducing apparatus as claimed in claim 18 in the reproducing apparatus as claimed in claim 16, since there are provided a plurality of error-correcting means for error-correcting reproduced data and wherein the reproduced data error-corrected by the plurality of error-correcting means are temporarily and respectively memorized in the different buffer means, the minimum unit in which data are reproduced in a time-division manner may be set to be less than a unit in which the error-correction code is added to data. Thus, it becomes possible to reproduce each information at an arbitrary timing in a time-division manner.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A recording method for recording information on a recording medium with a recording head, comprising the steps of:

temporarily storing a plurality of programs;
   switching a recording program periodically whereby head seek is performed according to said switching; and
   recording respective temporarily stored programs on different recording areas of said recording medium in a time-division manner.

2. A recording method as claimed in claim 1, wherein a transfer rate at which said temporarily stored programs are recorded on said recording medium is set to be higher than a transfer rate of said plurality of programs, and a storage capacity for temporarily storing said plurality of programs is set on the basis of a data amount calculated from each transfer rate and a maximum seek time of means for recording each of said plurality of programs on said recording medium.

3. A recording method as claimed in claim 1, wherein a timing at which said plurality of programs are recorded on said recording medium in a time-division manner is controlled based on the remaining amount of the temporarily stored programs in memory.

4. A recording method as claimed in claim 1, wherein each of said plurality of programs is processed by an error-correction code generating process.

5. A recording method according to claim 1, wherein said recording head further reproduces said plurality of programs recorded on said recording medium; the reproduced plurality of programs being temporarily stored in said plurality of buffer means; said recording head recording and reproducing said plurality of programs in a time-division manner.

6. A recording apparatus for recording information on a recording medium, comprising:

a plurality of buffer means for temporarily storing a plurality of programs; and
   a pickup for recording the stored plurality of programs on nonsequential recording areas of said recording medium in accordance with a received address for each program.

7. A recording apparatus as claimed in claim 6, wherein said recording medium is an optical disk and said pickup is an optical pickup for irradiating a laser light on said optical disk.

8. A recording apparatus as claimed in claim 7, wherein said optical pickup records data in a time-division manner based on a memory remaining amount of said buffer means.

9. A recording apparatus according to claim 7, further comprising a plurality of error-correction code generating means for generating an error-correction code for data to be recorded and wherein said respective error-correction code generating means add the error-correction codes to the temporarily stored programs in said respective separate buffer means.

10. A recording apparatus according to claim 6, wherein said pickup further reproduces said plurality of programs recorded on said recording medium; the reproduced plurality of programs being temporarily stored in said plurality of buffer means; said pickup recording and reproducing said plurality of programs in a time-division manner.

11. A reproducing method for reproducing information from a recording medium with a recording head, comprising the steps of:

reproducing a plurality of programs recorded on respective different recording areas;
   temporarily storing the plurality of reproduced programs;
   switching a reproducing program periodically whereby head seek is performed according to said switching; and
   successively outputting each of the stored programs.

12. A reproducing method as claimed in claim 11, wherein a transfer rate when data is reproduced from said recording medium and temporarily stored is set to be a rate higher than a transfer rate of said plurality of programs, and a storage capacity for temporarily storing said plurality of programs is set by a data amount calculated from each transfer rate and a maximum seek time of means for reproducing each of said plurality of programs from said recording medium.

13. A reproducing method as claimed in claim 11, wherein said plurality of programs are reproduced in a time-division manner based on the remaining capacity for temporarily storing programs in memory.

14. A reproducing method as claimed in claim 11, wherein each of the reproduced programs is individually error-corrected and temporarily stored.

15. A reproducing apparatus for reproducing information from a recording medium, comprising:

a pickup for reproducing a plurality of programs recorded nonsequentially on different recording areas of said recording medium in accordance with a received address for each program; and a plurality of buffer means for temporarily storing said plurality of programs reproduced by said pickup.

16. A reproducing apparatus as claimed in claim 15, wherein said recording medium is an optical disk and said pickup is an optical pickup for generating a reproduced signal from a reflected-back light by irradiating a laser light on said optical disk.

17. A reproducing apparatus as claimed in claim 16, wherein said optical pickup reproduces data in a time-division manner based on a memory remaining amount of said buffer means.

18. A reproducing apparatus according to claim 16, further comprising a plurality of error-correcting means for error-correcting the reproduced programs.

* * * * *